US008101111B2

(12) United States Patent
Decher et al.

(10) Patent No.: US 8,101,111 B2
(45) Date of Patent: Jan. 24, 2012

(54) METHOD FOR THE PRODUCTION OF MOLDED SKINS FROM A PLURALITY OF PLASTIC MATERIALS HAVING IMPROVED PROPERTIES DURING AIRBAG DEPLOYMENT AT LOW TEMPERATURES

(75) Inventors: Heribert Decher, Barsinghausen (DE); Walter Andre, Bomlitz (DE); Zbigniew Parzelski, Braunschweig (DE); Marko Sander, Leipzig (DE); Christian Seidel, Hannover (DE); Michael Heidkamp, Dedelstorf (DE)

(73) Assignee: Johnson Controls Interiors GmbH & Co. KG, Grefrath (DE)

( * ) Notice: Subject to any disclaimer, the term of this patent is extended or adjusted under 35 U.S.C. 154(b) by 0 days.

(21) Appl. No.: 12/450,240

(22) PCT Filed: Mar. 19, 2008

(86) PCT No.: PCT/EP2008/053284
§ 371 (c)(1),
(2), (4) Date: Nov. 13, 2009

(87) PCT Pub. No.: WO2008/113817
PCT Pub. Date: Sep. 25, 2008

(65) Prior Publication Data
US 2010/0129664 A1  May 27, 2010

(30) Foreign Application Priority Data

Mar. 21, 2007 (DE) .......................... 10 2007 013 449
Jan. 16, 2008 (EP) ................... PCT/EP2008/050413

(51) Int. Cl.
B28B 7/22 (2006.01)
B32B 37/00 (2006.01)
B29C 41/18 (2006.01)
B29C 41/08 (2006.01)
G01V 9/00 (2006.01)
B28B 1/38 (2006.01)
B28B 1/32 (2006.01)
B28B 1/02 (2006.01)

(52) U.S. Cl. ....... 264/302; 264/45.7; 264/254; 264/255; 264/306; 264/309; 264/310

(58) Field of Classification Search .................. None
See application file for complete search history.

(56) References Cited

U.S. PATENT DOCUMENTS

| 4,925,151 | A | * | 5/1990 | Gray ................................ 249/65 |
| 5,013,508 | A | * | 5/1991 | Troester ......................... 264/224 |
| 5,234,653 | A | | 8/1993 | Buzzoni et al. |
| 5,288,549 | A | * | 2/1994 | Zeitler et al. ................ 428/318.6 |
| 5,316,715 | A | * | 5/1994 | Gray ............................ 264/245 |
| 5,370,831 | A | | 12/1994 | Blair et al. |
| 5,580,501 | A | * | 12/1996 | Gallagher et al. ........... 264/45.3 |
| 5,863,064 | A | | 1/1999 | Rheinlander et al. |
| 5,900,196 | A | * | 5/1999 | Cittadini et al. ............. 264/46.5 |
| 6,071,619 | A | | 6/2000 | De Winter |
| 6,166,135 | A | | 12/2000 | Kaufhold et al. |
| 6,312,633 | B1 | * | 11/2001 | Kiesel et al. ................... 264/125 |
| 6,318,783 | B1 | * | 11/2001 | Knox ............................ 296/39.1 |
| 6,524,509 | B1 | * | 2/2003 | Shope et al. ................... 264/246 |
| 6,787,076 | B2 | * | 9/2004 | Sugimoto et al. ............... 264/41 |
| 6,803,417 | B2 | * | 10/2004 | Cree et al. ..................... 525/191 |
| 6,875,390 | B2 | * | 4/2005 | Cowelchuk ................... 264/255 |
| 6,906,144 | B2 | * | 6/2005 | Jeong et al. ................... 525/240 |
| 2002/0140128 | A1 | * | 10/2002 | Wolfgram ..................... 264/236 |
| 2004/0099988 | A1 | | 5/2004 | Cowelchuk |
| 2006/0208389 | A1 | | 9/2006 | Nyssen |
| 2010/0090360 | A1 | * | 4/2010 | Walter et al. ................. 264/45.7 |

FOREIGN PATENT DOCUMENTS

| DE | 198 00 287 | | 7/1999 |
| DE | 694 28 377 | | 7/2002 |
| EP | 0 972 625 | | 1/2000 |
| FR | 2763533 A1 | * | 11/1998 |
| FR | 2763535 A1 | * | 11/1998 |
| JP | 59159309 A | * | 9/1984 |
| JP | 59192524 A | * | 10/1984 |
| JP | 60-208210 | | 10/1985 |
| JP | 03055219 A | * | 3/1991 |
| JP | 10095250 A | * | 4/1998 |
| JP | 11-348057 | | 12/1999 |
| JP | 2002011744 A | * | 1/2002 |
| WO | WO 2004/082917 | | 9/2004 |

OTHER PUBLICATIONS

Translation of JP 11-348057 A, Dec. 2010.*
Translation of JP 60-208210 A, Dec. 2010.*
International Search Report.

* cited by examiner

*Primary Examiner* — Christina Johnson
*Assistant Examiner* — Benjamin Schiffman
(74) *Attorney, Agent, or Firm* — Collard & Roe, P.C.

(57) ABSTRACT

The invention relates to a method and a device for the production of plastic molded skins, which are formed by consecutively performing a plurality of partial melting processes of a plurality of plastic materials, wherein the first plastic material is applied to the mold as a plastic powder in a centrifugal molding method and the second plastic material by a spraying method.

17 Claims, No Drawings

METHOD FOR THE PRODUCTION OF MOLDED SKINS FROM A PLURALITY OF PLASTIC MATERIALS HAVING IMPROVED PROPERTIES DURING AIRBAG DEPLOYMENT AT LOW TEMPERATURES

CROSS REFERENCE TO RELATED APPLICATIONS

This application is the National Stage of PCT/EP2008/053284 filed on Mar. 19, 2008, which claims priority under 35 U.S.C. §119 of German Application No. 10 2007 013 449.7 filed on Mar. 21, 2007 and PCT/EP2008/050413 filed on Jan. 16, 2008. The international application under PCT article 21(2) was not published in English.

The invention relates to a process and an apparatus for the production of molded plastics skins, in particular for motor-vehicle-interior parts e.g. dashboards and door cladding, where the molded plastics skins are constructed by successive repeated continuous fusion of a plurality of plastics materials of different properties at surface regions of a heated mold.

There are known processes of this type for the production of molded plastics skins by successive fusion of a plurality of plastics powders in the production of dual-color molded plastics skins, very generally using masks for the covering of individual regions.

EP 0 972 625 A1 describes in this connection a device, namely a mold for the production of dual-color molded plastics skins for motor-vehicle parts, i.e. in essence dashboards, door cladding, etc. The production process applied here for the production of sinter foils/slush skins is rotational sintering in which there is a plastics powder in the rotating mold and this fuses onto appropriately heated parts of the wall of the mold.

The device revealed here has two different lower parts of the molding boxes. The lower parts of the molding boxes, which also respectively comprise the powder bed, have been releaseably arranged with respect to the single upper molding box, onto which the plastics powder fuses. For the production of dual-color molded plastics skins, the first lower molding box then has a hollow rounded protruding element, protruding into the interior, and covering parts of the upper mold box—in the manner of a mask.

In a first operation, rotation sintering is used to fuse a powder of a first color, and those regions of the upper molding box which are situated under the hollow rounded covering element are not impacted here and therefore remain free from powder.

Prior to a second operation, the first lower molding box is replaced by a second lower molding box, which comprises a powder of another color and has no covering elements. During the rotational sintering process subsequently repeated, the powder with the new color fuses on the previously uncovered region of the upper molding box and on the reverse side of the existing molded skin. After cooling and removal of the molded skin from the mold, a dual-color molded plastics skin is obtained on the future external side facing toward the mold.

To this end, during the first operating step, the hollow rounded covering element protruding into the interior and associated with the lower molding box has to be carefully sealed with respect to the upper molding box, in order that no sinter powder of the first color passes into the covered region. For this purpose, the edges of the hollow rounded protruding element have sealing elements which have been designed to be elastic and/or hollow; pressure or elastic media can, if appropriate, be applied to the interior of these.

Disadvantageous here are the high operating cost which is required for the changeover of the lower molding boxes and which arises through the need to use covering elements/masks, and also the difficulty in achieving sealing of the mask, i.e. sealing between the edges of the hollow rounded covering element protruding into the interior and associated with the lower molding box and the inner side of the upper molding box. Leaks and uneven seating, which can blur boundaries between the colors here, are caused by thermal expansion, and by varying pressure conditions which affect the seals and which result from complicated internal shapes of the upper molding box.

A similar situation applies with the powder sintering process disclosed by WO 2004/082917, with a plurality of powder-application steps. Essential to the invention in the case of this process is the use of a mask and, located on the mask, an inflatable seal which is laterally in contact with and between delimiting fillets, with inflation automatically providing firm clamping of the mask. A first powder-application step is thus first carried out, while the mask is in a clamped position, and then the mask is removed, and powder sintering is again carried out. Even if the powder boxes required for this purpose can per se be of simpler structure, the handling of a plurality of heavy boxes with different types of powder has to be considered rather disadvantageous for mass production.

U.S. Pat. No. 5,234,653 describes a process for the production of multicolor molded plastics skins by sintering, using a plastics powder in a mold divided by separating walls and fusing the powder on appropriately heated parts of the wall of the mold. The separating walls are fixed here by way of pressure systems within the separating walls. By virtue of the pressure system, the separating walls are braced between a lower and upper mold with the aid of sealing profiles, thus providing reliable sealing during the respective sintering procedures using different color powders.

Here again, a disadvantage is that relatively complicated fixing of the separating walls has to be undertaken, and a high pressure force is also required for the pressure systems.

DE 694 28 377 T2 discloses a process and an apparatus for the conduct of a spray molding process for a dual-color process in which, in the upper region, a mask is placed onto a fillet which delimits certain regions of a spray mold and isolates them from the remaining regions of the surface. The edges of the mask here project toward the spray side to some extent. The elastomeric spray material is then sprayed onto one side of the upstanding edge. The mask is then removed, and spraying is used to apply another elastomeric material, for example one of another color. On the basis of the materials described in the examples of the invention, the disclosure comprises a process for the spraying of liquid components. However, spray processes using a plurality of different liquid materials are difficult to operate in industrial mass production processes, simply because of the amounts of solvent required.

"Patent Abstracts of Japan" discloses, with publication number 1 134 8057, a Japanese publication which discloses a combined spray and sintering process, which likewise uses masks to cover individual regions of a mold and applies a first plastics powder in a first sub-region of the mold by spraying, and then removes the mask. The second plastics powder is then applied by sintering in a further operating step onto those regions of the mold that have not yet been coated, and onto those regions previously coated with the first powder. Here again, a disadvantage is that the handling of the masks is relatively complicated.

The invention was therefore based on the object of providing a process and an apparatus for the production of molded plastics skins, composed of regions of different plastics, reliably providing a molded plastics skin of high quality and capable of reliably adjusting the properties and the perceived quality/feel of the molded plastics skin to the intended application over a wide range via the selection of the materials and steps of the process.

A further object consisted in providing a material for molded plastics skins which is particularly suitable for reliable non-splintering fracture during operation of an airbag.

Said object is achieved via the features of the main claim. Advantageous embodiments are given in the dependent claims. An apparatus of the invention is also disclosed, for conducting the process.

In the process,
a) first, the first plastics material in the form of plastics powder is applied by a rotational sintering process (rotation of a powder box) to the mold, and the mold is heated to, and kept at, a first temperature of from 180 to 240° C. during the fusion and gelling of the plastics powder, and so the first plastics powder applied adheres by fusion to the mold,
b) then a second plastics material is applied by a spray process, and the second plastics material here adheres by fusion to the first plastics powder, and then the mold is adjusted to a second temperature in such a way that the plastics material applied by spraying is heated to, and kept at, a temperature of 60 to 250° C., and the first plastics powder and the second plastics material here react to completion and fuse to give a homogeneous molded plastics skin, and
c) the resultant molded plastics skin is cooled, and so it can be removed from the mold, and
the layer thickness applied of the first plastics powder applied to the mold is from 200 to 15 000 μm, and the layer thickness applied of the second plastics material applied is from 50 to 1700 μm.

Surprisingly, it has been found that the essential properties of a molded plastics skin in relation to perceived surface quality, shape, color, and surface tension, and feel can be adjusted in a precise and targeted manner by using an outer layer which is only very thin, produced according to the invention, in combination with a backing or supportive layer situated thereunder. Furthermore, use of the differently formulated materials, combined with one another in the manner of the invention, reliably avoids splintering or escape of particles when the molded plastics skin is fractured by deployment of an airbag.

In one advantageous embodiment of the process, the second plastics material applied is a plastics powder, or is a liquid plastic, or is a plastisol, which is applied by a spray process. This provides advantages in handling and facilitates application and the adjustment of the properties.

In another advantageous embodiment of the process, the second plastics material applied is applied in the form of a single web to the reverse side of the first layer. This permits precise definition of the area active during fracture of the airbag. The same advantages are achieved via alternative process embodiments, for example where the second plastics material applied is applied in a plurality of webs to the reverse side of the first layer, the second plastics material applied is applied in sheet form, in a particular region, to the reverse side of the first layer, the second plastics material is applied to the reverse side of the first layer in regions which have been isolated with the aid of fillets from the remaining regions of the reverse side, or, during the application of the second plastics material to the reverse side of the first layer, the regions not to be coated with the second plastics material have been covered with the aid of masks or covering elements.

In another advantageous embodiment of the process, the second plastics material applied is applied to the entire reverse surface of the first layer. It is then possible to select any desired location for the airbag at a subsequent stage.

In another advantageous embodiment of the process, the layer thickness applied of the first plastics powder, applied by means of rotational sintering to the mold, is from 500 to 1500 μm, and the layer thickness applied of the second plastics material, applied by spraying to the first layer, is from 150 to 750 μm.

An advantage of this type of embodiment of the process of the invention, in the conduct of the process, is that the layer thicknesses of the individual plastics materials can be designed with high precision. The spray process with this layer thickness moreover requires no great machinery cost beyond that for a correspondingly equipped and, if appropriate, robot-controlled spray equipment/spray gun, and this process can, given the absence of heavy moving machinery parts, achieve high cycle times in mass production.

The second plastics powder applied to the mold is advantageously composed of a thermoplastic material to which a filler has been admixed. This likewise serves for precision-targeted adaptation of perceived surface quality, shape, color, and surface tension, and feel. The same applies to another advantageous embodiment, in which the second plastics powder applied to the mold is composed of a thermoplastic material with a grain size of from 30 to 300 μm, to which glass fibers or natural fibers have been admixed.

In another advantageous embodiment, the Shore hardness of the finished molded plastics skin is from 60 (Shore A) to 45 (Shore D). This gives a particularly attractive feel to the molded plastics skin, and also an opportunity to influence the mechanical properties/strength properties of the molded skin.

In another advantageous embodiment, the second plastics powder applied to the mold is composed of recycling material. This permits reuse of excess plastics offcuts from preceding manufacturing operations, or of returns of used plastics material.

In another advantageous embodiment, there are fillets protruding on the surface of the mold, and these separate the surface regions provided with plastics powders of different properties, and at least one of the surface regions delimited by the fillets here is provided, during fusion of a first plastics powder, with a covering element or mask which has a seal in its edge areas and is in contact with the fillets; the covering element or mask here is removed from the surface of the mold prior to application of the second plastics powder. By using this type of process it is possible to achieve targeted control of individual regions of the molded plastics skin.

In another advantageous embodiment, the plastics powders have, as different property, a different color. This then permits, in a simple manner and with the advantages described, the production of dashboards, for example, whose upper part facing toward the windshield is designed with a color and pigment density that eliminate problematic reflected sunlight.

In another advantageous embodiment, the plastics powders have, as different property, a different density and/or degree of foaming. This provides a simple method of producing surfaces which, for example, have a different perceived quality or feel in different regions.

In another advantageous embodiment, during the powder spraying in step a) of the process, the temperature of the mold is from 190 to 210° C. preferably 195° C. The result of this, in conjunction with the kinetic energy of the spray process and with the other features of the process, specifically that, during the fusion of the first plastics powder, in the subsequent step b) of the process the temperature of the mold is from 200 to 220° C. preferably 210° C., is an initial slight degree of "attachment", and just an incipient slight degree of coagulation of the spray powder, which, although it is sufficient to fix the powder particles in position, does not yet permit "melting of the entire material".

In another advantageous embodiment of the process, for complete reaction and fusion of the first and second plastics powder, to give a homogeneous molded plastics skin, in an additional step d) of the process, the temperature of the mold is from 225 to 240° C., preferably 235° C. The result of this is then, together with the second plastics powder, introduction of sufficient heat for complete melting and coagulation, and therefore for formation of a homogeneous molded plastics skin composed of a plurality of layers/colors.

In another advantageous embodiment of the process, a plurality of plastics powders are successively applied by rotational sintering or by powder spraying to the mold. This too, permits precise selection, as desired, of surface character and feel.

One particularly suitable molded plastics skin, produced by the process of the invention, for motor-vehicle-interior parts, e.g. dashboards and door cladding, is characterized in that the outer layer which is external within the plastics skin and has been applied by means of powder-spraying processes to the mold is composed of polyvinyl chloride (PVC), and the backing layer situated thereunder within the plastics skin, and applied by rotational sintering to the mold is composed of a plastics mixture of in essence from 60 to 90% of polyvinyl chloride (PVC) and from 10 to 40% of polyurethane (PU). In an embodiment using material of these types it is possible to influence and adjust the fracture properties and tensile strain properties of the molded plastics skin, the result being particular suitability for an advantageous use as covering element for regions provided with airbag-trigger devices, in the interior cladding of motor vehicles.

The lower layer of the molded plastics skin is advantageously composed of material having low-temperature flexibility, and in particular here of acrylates, of unsaturated polyolefins or of polyurethane. The result is reliable elimination of splintering or escape of particles during fracture of the molded plastics skin by airbag deployment, even at temperatures extending to −40° C. When the molded plastics skin is fractured in an airbag deployment test, the good adhesion of the layers to one another reduces the tendency for particles to escape from the upper layer, which is generally below the glass transition temperature, because the particles adhere to the material having low-temperature flexibility.

The second layer can also advantageously have points of weakness, which can be introduced by various devices, for example by knives or by laser cutting.

What is claimed is:

1. A process for the production of molded plastics skins, in particular for motor-vehicle-interior parts e.g. dashboards and door cladding, where the molded plastics skins are constructed by successive repeated continuous fusion of a plurality of plastics materials of different properties at surface regions of a heated mold, wherein
   a) first, the first plastics material in the form of plastics powder is applied by a rotational sintering process (rotation of a powder box) to the mold, and the mold is heated to, and kept at, a first temperature of from 180 to 240 degrees C. during the fusion and gelling of the plastics powder, and so the first plastics powder applied adheres by fusion to the mold,
   b) then a second plastics material is applied by a spray process, and the second plastics material here adheres by fusion to the first plastics powder, and then the mold is adjusted to a second temperature in such a way that the plastics material applied by spraying is heated to, and kept at, a temperature of 60 to 250 degrees C., and the first plastics powder and the second plastics material here react to completion and fuse to give a homogeneous molded plastics skin, and
   c) the resultant molded plastics skin is cooled, and so it can be removed from the mold, and
   the layer thickness applied of the first plastics powder applied to the mold is from 200 to 15 000 μm, and the layer thickness applied of the second plastics material applied is from 50 to 1700 μm; wherein
   the second plastics material is applied to the reverse side of the first layer in regions which have been isolated with the aid of fillets from the remaining regions of the reverse side.

2. The process as claimed in claim 1, in which the second plastics material applied is a plastics powder which is applied by a spray process.

3. The process as claimed in claim 1, in which the second plastics material applied is a liquid plastic or a plastisol which is applied by a spray process.

4. The process as claimed in claim 1, in which the second plastics material applied is applied in the form of a single web to the reverse side of the first layer.

5. The process as claimed in claim 1, in which the second plastics material applied is applied in a plurality of webs to the reverse side of the first layer.

6. The process as claimed in claim 1, in which the second plastics material applied is applied in sheet form, in a particular region, to the reverse side of the first layer.

7. The process as claimed in claim 1, in which the layer thickness applied of the first plastics powder, applied by means of rotational sintering to the mold, is from 500 to 1500 μm, and the layer thickness applied of the second plastics material, applied by spraying to the first layer, is from 150 to 750 μm.

8. The process as claimed in claim 7, in which the layer thickness applied of the second plastics material, applied by spraying to the first layer, is from 250 to 500 μm.

9. The process as claimed in claim 1, wherein one of the two plastics materials applied is composed of a thermoplastic material to which a filler has been admixed.

10. The process as claimed in claim 9, wherein the first plastics powder applied to the mold is composed of a thermoplastic material with a grain size of from 30 to 300 μm, to which glass fibers or natural fibers have been admixed.

11. The process as claimed in claim 1, wherein the Shore hardness of the finished molded plastics skin is greater than 60 (Shore A) and is less than 45 (Shore D).

12. The process as claimed in claim 1, wherein the first or second plastics powder applied to the mold is composed of recycling material.

13. The process as claimed in claim 1, where the plastics materials have, as different property, a different color.

14. The process as claimed in claim 1, where the plastics powders have, as different property, a different density and/or degree of foaming.

15. The process as claimed in claim 1, where a plurality of plastics materials are successively applied by spraying or rotational sintering to the mold.

16. The process as claimed in claim 1, where the layer applied second has been provided with lines of weakness.

17. A process for the production of molded plastics skins, in particular for motor-vehicle-interior parts e.g. dashboards and door cladding, where the molded plastics skins are constructed by successive repeated continuous fusion of a plurality of plastics materials of different properties at surface regions of a heated mold, wherein a) first, the first plastics material in the form of plastics powder is applied by a rotational sintering process (rotation of a powder box) to the mold, and the mold is heated to, and kept at, a first temperature of from 180 to 240 degrees C. during the fusion and gelling of the plastics powder, and so the first plastics powder applied adheres by fusion to the mold, b) then a second plastics material is applied by a spray process, and the second plastics material here adheres by fusion to the first plastics powder, and then the mold is adjusted to a second temperature in such a way that the plastics material applied by spraying is heated to, and kept at, a temperature of 60 to 250 degrees C., and the first plastics powder and the second plastics material here react to completion and fuse to give a homogeneous molded plastics skin, and c) the resultant molded plastics skin is cooled, and so it can be removed from the mold, and the layer thickness applied of the first plastics powder applied to the mold is from 200 to 15 000 μm, and the layer thickness applied of the second plastics material applied is from 50 to 1700 μm; wherein during the application of the second plastics materiel to the reverse side of the first layer, the regions not to be coated with the second plastics material have been covered with the aid of masks or covering elements.

* * * * *